United States Patent [19]

Whittle

[11] 4,082,632
[45] Apr. 4, 1978

[54] PRODUCTION OF PERFORATED METAL FOIL

[75] Inventor: John Edward Whittle, Sutton Coldfield, England

[73] Assignee: The International Nickel Company, Inc., New York, N.Y.

[21] Appl. No.: 789,689

[22] Filed: Apr. 21, 1977

Related U.S. Application Data

[63] Continuation of Ser. No. 715,534, Aug. 18, 1976, abandoned.

[30] Foreign Application Priority Data

Aug. 26, 1975 United Kingdom ............... 35178/75

[51] Int. Cl.² .............................. C25F 3/14; C25F 3/02
[52] U.S. Cl. ................................ 204/129.65; 204/206
[58] Field of Search ................. 204/129.65, 129.1, 206

[56] References Cited

U.S. PATENT DOCUMENTS

| | | | |
|---|---|---|---|
| 2,620,296 | 12/1952 | Wilsdon | 204/129.65 |
| 2,968,555 | 1/1961 | Bendler et al. | 96/38 |
| 3,429,751 | 2/1969 | Heuse | 136/120 |
| 3,471,385 | 10/1969 | Farrell | 204/206 |
| 3,541,083 | 11/1970 | Beemer et al. | 204/206 |
| 3,723,269 | 3/1973 | Hofling | 204/129.65 |

FOREIGN PATENT DOCUMENTS

| | | |
|---|---|---|
| 1,212,156 | 3/1960 | France. |
| 1,496,732 | 7/1969 | Germany. |
| 1,260,912 | 2/1968 | Germany. |
| 561,788 | 6/1944 | United Kingdom. |
| 586,003 | 3/1947 | United Kingdom. |
| 872,961 | 7/1961 | United Kingdom. |
| 1,009,518 | 11/1965 | United Kingdom. |
| 1,132,833 | 11/1968 | United Kingdom. |

OTHER PUBLICATIONS

Development of Large-Internal-Surface-Area Nickel-Metal Plaques by J. Mc Callum, et al, NASA, Battelle Memorial Institute, Sept. 30, 1965, 120 pages.

Primary Examiner—T. M. Tufariello
Attorney, Agent, or Firm—George N. Ziegler; Ewan C. MacQueen

[57] ABSTRACT

Continuous lengths of metal foil, such as 4 micron thick nickel foil stored in coils, are perforated by anodic etching through a perforated titanium mask while foil and mask are simultaneously moving together through electrolytic etching bath.

7 Claims, 1 Drawing Figure

U.S. Patent April 4, 1978 4,082,632
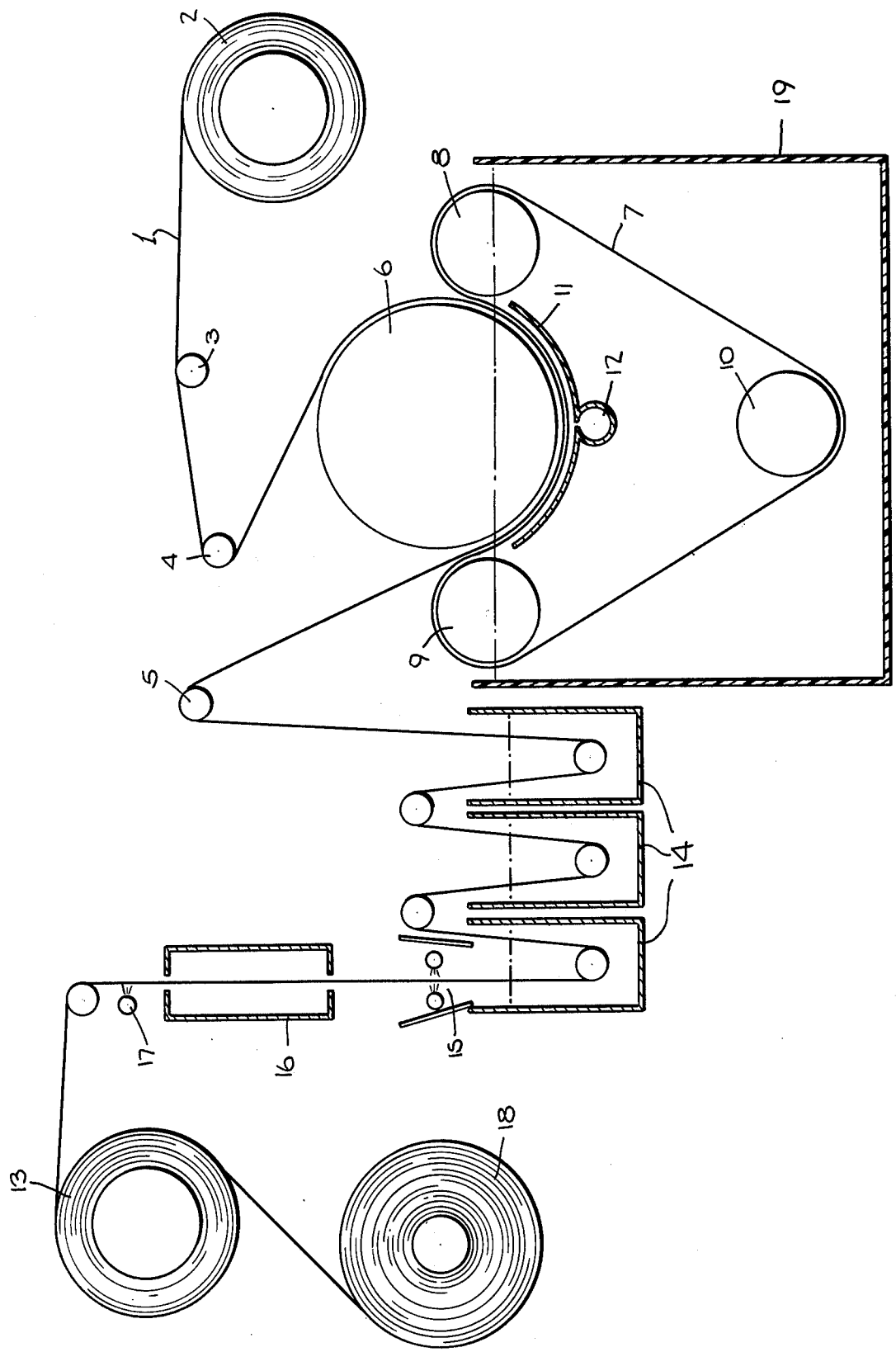

PRODUCTION OF PERFORATED METAL FOIL

This is a continuation of application Ser. No. 715,534 filed Aug. 18, 1976 now abandoned.

This invention relates to metal foils and more particularly to production of continuous lengths of perforated metal foil.

There are commercial needs for continuous lengths of metal foil having a repeating pattern of perforations therethrough, for instance, for components in optical, electronics and battery apparatus. Heretofore, perforated foil has been made continuously by electroforming processes wherein the foil is electrodeposited on a pitted mandrel. Such a process has been described in a paper entitled Electroforming of Nickel Screens, delivered by J Van der Waals at the Symposium on Nickel Deposition in the Engineering Industries held in October 1963 and abstracted in the Nickel Bulletin of October 1963 page 235-236.

Whilst the process works well, there are uneconomic shortcomings, including initial costs and relatively short life of the mandrels, and undesired costs of reclaiming mandrels after mechanical and/or chemical degradation during use in the process.

Anodic etching techniques have been taught for shaping metal bodies, e.g., UK Pat. No. 561,788. And, with a process in UK Pat. No. 1,009,518, metal foil is perforated batchwise by sandwiching the foil between two conforming masks of the desired configuration and subjecting the foil to an anodic etching treatment but, however, batch processes do not provide all the benefits of continuous production of perforated foil, e.g., production of practically any desired length, and have special difficulties, e.g., aligning the masks in proper conformance.

There has now been discovered an apparatus and a process having economic advantages for continuous production of perforated metal foil.

It is an object of the invention to provide apparatus for continuously preparing perforated metal foil.

Another object is to provide a process for continuously preparing metal foil in a perforated condition.

Other objects and advantages will become apparent from the following description taken in conjunction with the accompanying drawing showing a schematic depiction of apparatus for carrying out the invention.

According to the present invention a process for the production of a continuous length of perforated metal foil comprises passing a continuous length of foil through an electrolytic etching bath, one face of the foil being in contact with an endless surface, e.g., a roll, the contacting surface of which is inert with respect to the electrolyte, and with the other face of the foil against an endless perforated titanium mask simultaneously moving in contact with the foil, and meanwhile applying a potential difference of up to 10V(volts) across the foil and a cathode immersed in the bath, whereby the foil portions exposed to the bath through the perforated mask are anodically etched away. Although other processes may use other materials for masking, the present invention requires a moving mask of titanium and thereby provides, inter alia, important advantages of resistance under anodic conditions and necessary dimensional stability. Moreover, the titanium mask may readily be produced, perforated with a desired hole pattern, by conventional techniques.

The process is most suitably applied to metal foils of nickel, copper, iron and alloys based thereon in thicknesses up to about 125 $\mu m$ (microns) thick.

The invention provides apparatus for perforating metal foil comprising a tank suitable for holding an electrolytic etching solution, an endless movable surface, e.g., a cylindrical face on a roll, of material inert to the electrolyte, an endless perforated titanium mask, means for supporting the inert surface and the titanium mask movably to provide that a foil to be perforated may be passed through the tank and held with one face of the foil in contact with the movable inert surface and the other face in contact with the titanium mask, and means for supplying electric current to the foil and a cathode operably spaced apart from the titanium mask.

The inert-faced roll is advantageously made of, of covered with, a non-conducting flexible material such as rubber.

In a preferred process foil is passed across a large diameter, e.g., 15 centimeter, roll so that the foil is in contact with the roll over at least about 50% of the circumference of the roll.

Preferably, the cathode substantially conforms in shape to the belt or roll so that an approximately constant distance is maintained between the foil and the cathode during the major proportion of the passage of the foil through the electrolytic bath. The space between the anode and the cathode is preferably less than 20 mm, and is normally about 2 mm.

It has been found to be advantageous for the cathode to be provided with regularly located holes along its length and to be connected to a manifold through which electrolyte is supplied so that in use electrolyte may be pumped through the holes and jetted on to the surface of the foil exposed through the mask.

The titanium mask, an endless belt, is conveniently perforated in the desired configuration by photomechanical etching techniques. In a preferred technique, titanium strip is thoroughly cleaned and dip-coated with photo-resist prior to air drying and baking. The coated titanium is then inserted between and in contact with two identical photomasks connected in register and both sides exposed. The exposed mask is then developed to remove unexposed resist, then baked and etched on both sides until complete perforation is achieved. To compensate for undercutting during the etching stage, each dot on the photomask is smaller in size by an amount equal to the undercut. Subsequently, photoresist is removed with solvent, the surface of the mask cleaned, and the mask trimmed to length and spot-welded to form an endless belt.

In preferred apparatus for carrying out the present process the titanium mask is preferably mounted on three or more rotatable rolls, at least one of which is adjustable, or sprung, so that in use the mask is held tightly against the foil during passage in the electrolytic bath. Conveniently, drive is applied to one of the rolls on which the mask is mounted and the foil is transported by friction against the mask. The bearing friction reenforces the clamping pressure between the mask and foil held against the inertfaced roll. Current may be fed to the foil by passage over a current-feeding roll positioned before the inert roll, or via the roll if comprising a conducting material such as titanium.

Any suitable etching bath may be used in processes of the present invention and typical electrochemical machining electrolytes are particularly useful. For the perforation of nickel foil a high chloride electrolyte is recommended to obtain good perforations without passivation occurring. Where the electrolyte bath is not agitated, very low pHs, e.g., about 1, may also be needed to prevent passivation. It has been found, generally, that forced circulation of the electrolyte allows the perforation rate to be increased. A preferred electrolyte for the production of perforated nickel foil comprises approximately 20% sodium chloride solution at a pH of between 1 and 7, and preferably between about 4 and 6. At higher pH values the nickel precipitates as the hydroxide and if allowed to build up in the sodium chloride electrolyte, is deposited on the titanium mask. This is undesirable for long term operation and at these pHs it may be desirable to continuously separate the precipitated nickel hydroxide from the sodium chloride electrolyte. At lower pHs the nickel is retained in solution and if the concentration is limited, for example, by ion exchange techniques, there will be no deposition of nickel at the cathode.

It is important that the potential on the titanium mask surface should not be allowed to exceed about 10 volts, anodic, which would allow immediate corrosion to occur. Such a circumstance would only be likely to occur if complete passivation of the foil occurred, for example, in the event of failure of the pump circulating the electrolyte, or of failure of the foil-driving means, possibly resulting in all exposed foil being dissolved. Preferably, means of automatically cutting-off power supply to the foil in the event of a pump or drive failure should be incorporated into the apparatus.

It has been found, surprisingly, that in processes of the present invention, the current required for perforation may be less than theoretical. The etching process tends to occur from the outside of the holes inwards and normally small discs of the metal foil drop out as the hole is etched similarly to being trepanned in the foil. Thus the amount of current theoretically required to dissolve the central portion of the hole is not always required for practice herein. Although the process may be operated at current densities of about $100A/dm^2$ (amperes per square decimeter), it is advantageous to operate at as high a current density as possible, conveniently about $600A/dm^2$ for the perforation of 4 $\mu$m foil. Higher current densities are possible, the perforation rate being variable with the current carrying capacity of the foil.

The perforated foil leaving the electrolyte may conveniently be passed through a suitable washing bath, and then dried by passage through an oven. Air convection currents in the environment of the apparatus may tend to crease or wrinkle the fine foil, which is inhibited in the preferred process by cooling the perforated foil, when leaving the oven, by jets of air, and then the cooled foil is interleaved with tissue as it passes onto the take-up reel.

The process of the present invention is useful for preparing perforated foil having holes up to 6 mm or more in diameter, with up to 50% of the foil perforated, and is particularly useful in production of perforated foil for use in the production of battery electrodes, for example as disclosed and claimed in UK patent specification No. 1,246,048.

For purposes of giving those skilled in the art a further understanding of the advantages of the perforating process and apparatus of the invention, the following illustrative example is given in conjunction with the accompanying drawing which depicts the apparatus schematically from a horizontal view generally parallel to the surface of metal foil being passed over and under rollers.

Nickel foil 1, a 4 $\mu$m thick strip, is fed from supply reel 2 over current input roll 3 and over guide rolls 4 and 5 and partially around large diameter inert rubber-covered roll 6 disposed to provide that the foil contacts the roll 6 over about 50% or more of the circumference of the roll 6. Titanium mask 7 in the form of an endless belt was prepared from 100 $\mu$m thick fully-annealed titanium strip perforated in a desired hole pattern by the photo-mechanical etching technique referred to herein. The titanium mask 7 is mounted on three rolls 8, 9, and 10, one of which, roll 10, is adjustable and is set to hold the titanium mask tightly against the nickel foil 1 while mask 7, foil 1, and the peripheral surface of rubber-covered roll 6 move together on rotation of roll 6. The rolls 6, 8, 9 and 10 and an electrolyte are held in a polymethyl methacrylate tank 19. Foil 1 is driven by friction between itself and titanium mask 7, movement of which is powered by a motor controlling driving roll 9. Nickel cathode 11, conforming in shape to the curvature of rubber-covered roll 6, is positioned facing titanium mask 7 and the portions of nickel foil 1 that are exposed through the perforations of the mask.

Cathode 11 is provided with a series of holes along its axis of symmetry, and is linked to electrolyte manifold 12 through which a suitable electrolyte, such as 20% chloride solution at pH 1 to 5, is jetted. The gap between the cathode and the foil is of the order of 2 mm. Electrolyte overflowing from the edges of the cathode is recovered in the tank and recirculated by a suitable pumping device, which may be after passage over a suitable cation exchange resin, if desired, to remove nickel ions. The current and rate of throughput of the foil are adjusted for sufficient perforation according to needs, e.g., dimensions and percentages of perforation. Typically, a potential difference of about 5V is passed to give a current density of about $600A/dm^2$ at a foil throughput rate of about 100M/hour.

The perforated nickel foil is pulled through the remaining stages by take-up reel 13 driven via a slipping clutch, not shown. The perforated foil is passed through tanks 14 containing a suitable wash solution, such as 10% HCl, then through a water rinse 15 and a drying oven 16 heated by eight 250-watt silica infrared heaters. As the foil emerges from the oven it is cooled to room temperature by jets of compressed air at air jet source 17 and passes onto take-up reel 13, meanwhile being interleaved with tissue supplied from tissue roll 18. Guide rolls on the apparatus are provided with conventional means for maintaining alignment of the foil.

Although the present invention has been described in conjunction with preferred embodiments, it is to be understood that modifications and variations may be resorted to without departing from the spirit and scope of the invention as those skilled in the art will readily understand. For instance, the continuity of the process extends to continuous production wherein the passing of the foil through the bath includes cyclic pauses or reversals and yet is substantially continuous and is suitable for production with continuous lengths of foil unrolled from, and again rolled, into continuous coils. Such modifications and variations are considered to be within the purview and scope of the invention and appended claims.

I claim:

1. A process for the production of a continuous length of perforated metal foil comprising passing a continuous length of foil through an electrolytic etching bath wherein one face of the foil contacts a surface which is inert with respect to the electrolyte and the other face of the foil is in contact with an endless perforated titanium mask simultaneously moving together with the foil while in the bath, and applying a potential difference of up to 10 volts across the foil and a cathode immersed in the bath, whereby the portions of the foil exposed to the bath through the perforated mask are anodically etched away.

2. A process as claimed in claim 1 wherein the metal of the foil is from the group consisting of nickel, copper, iron and alloys based thereon.

3. A process as set forth in calim 1 wherein the foil is passed along the surface of a large diameter roll and is in contact with the roll on at least 50% of the circumference of the roll.

4. A process as set forth in claim 1 wherein nickel foil is perforated in a chloride bath at pH of 1 to 7 and the solution is maintained in agitation.

5. A process as set forth in claim 4 wherein the electrolyte is agitated by forced circulation and the pH of the electrolyte is between 4 and 6.

6. A process as set forth in claim 1 wherein the current density is maintained at about 600A/dm$^2$.

7. A process as set forth in claim 1 wherein the perforated foil is subsequently washed and dried and then cooled by air jets to prevent creasing.

* * * * *